US009674170B2

(12) United States Patent
Roth et al.

(10) Patent No.: US 9,674,170 B2
(45) Date of Patent: *Jun. 6, 2017

(54) AUTOMATED SECRET RENEGOTIATION

(71) Applicant: Amazon Technologies, Inc., Reno, NV (US)

(72) Inventors: Gregory Branchek Roth, Seattle, WA (US); Cristian M. Ilac, Sammamish, WA (US)

(73) Assignee: Amazon Technologies, Inc., Reno ( * ) Notice: Subject to any disclaimer, the term of this patent is extended or adjusted under 35 U.S.C. 154(b) by 0 days.

This patent is subject to a terminal disclaimer.

(21) Appl. No.: 14/292,404

(22) Filed: May 30, 2014

(65) Prior Publication Data

US 2014/0282950 A1    Sep. 18, 2014

Related U.S. Application Data

(63) Continuation of application No. 13/532,245, filed on Jun. 25, 2012, now Pat. No. 8,745,710.

(51) Int. Cl.
*H04W 12/06* (2009.01)
*H04L 29/06* (2006.01)
*H04W 12/04* (2009.01)
*H04L 9/08* (2006.01)

(52) U.S. Cl.
CPC ............ *H04L 63/08* (2013.01); *H04L 9/0872* (2013.01); *H04L 9/0891* (2013.01); *H04L 63/061* (2013.01); *H04L 63/0838* (2013.01); *H04W 12/04* (2013.01); *H04W 12/06* (2013.01)

(58) Field of Classification Search
CPC ... H04L 63/0838; H04L 63/061; H04L 63/08; H04W 12/04; H04W 12/06
USPC .............................................. 726/6
See application file for complete search history.

(56) References Cited

U.S. PATENT DOCUMENTS

| 4,369,332 A | * | 1/1983 | Campbell, Jr. | ................. 380/43 |
| 5,361,062 A | * | 11/1994 | Weiss et al. | ................. 340/5.26 |
| 5,717,756 A | * | 2/1998 | Coleman | ................. G06F 21/31 |
| | | | | 380/277 |

(Continued)

OTHER PUBLICATIONS

Time-based One-time Password Algorithm. (Dec. 5, 2011). In Wikipedia, The Free Encyclopedia. Retrieved 20:55, Oct. 10, 2013, from http://http://en.wikipedia.org/w/index.php?title=Time-based_One-time_Password_Algorithm&oldid=464159007.

(Continued)

*Primary Examiner* — Saleh Najjar
*Assistant Examiner* — Oleg Korsak
(74) *Attorney, Agent, or Firm* — Hogan Lovells US LLP

(57) ABSTRACT

Secret information, such as seeds, codes, and keys, can be automatically renegotiated between at least one sender and at least one recipient. Various mechanisms, such as counters, events, or challenges, can be used to trigger automatic renegotiations through various requests or communications. These changes can cause the current secret information to diverge from older copies of the secret information that might have been obtained by unintended third parties. In some embodiments, a secret can be configured to "decay" over time, or have small changes periodically introduced that can be determined to be valid by an authorized party, but can reduce the effectiveness of prior versions of the secret information.

20 Claims, 8 Drawing Sheets

(56) References Cited

U.S. PATENT DOCUMENTS

| | | | |
|---|---|---|---|
| 5,737,421 A * | 4/1998 | Audebert | 713/170 |
| 6,985,583 B1 | 1/2006 | Brainard et al. | |
| 7,363,494 B2 | 4/2008 | Brainard et al. | |
| 7,502,467 B2 | 3/2009 | Brainard et al. | |
| 2006/0112320 A1* | 5/2006 | Balakrishnan | G01R 31/318371 714/738 |
| 2006/0224647 A1* | 10/2006 | Gutnik | G06F 7/582 708/250 |
| 2011/0196965 A1* | 8/2011 | Romero | H04L 9/12 709/225 |

OTHER PUBLICATIONS

G. Richards (OTP Pre-authentication draft-ietf-krb-wg-otp-preauth-12, Apr. 7, 2010).
Ransford et. al. (SkewMask: Frustrating Clock Skew Fingerprinting Attempts, Dec. 12, 2007).
"Non-Final Office Action dated Sep. 20, 2013," U.S. Appl. No. 13/532,245, 12 pages.
"Notice of Allowance dated Feb. 11, 2014," U.S. Appl. No. 13/532,245, 9 pages.

\* cited by examiner

AUTOMATED SECRET RENEGOTIATION

CROSS-REFERENCE TO RELATED APPLICATIONS

This application is a continuation of U.S. patent application Ser. No. 13/532,245, filed Jun. 25, 2012, entitled "AUTOMATED SECRET RENEGOTIATION," which is hereby incorporated herein by reference in its entirety.

BACKGROUND

More users are utilizing network systems and services to obtain various types of information and perform various actions. In order to ensure the security of these actions, passwords, tokens, and other security mechanisms or credentials are put into place to attempt to prevent unauthorized access. It is often the case, however, that these credentials can be obtained by other users or devices, such as by a device intercepting a communication with a security credential or a person seeing a user enter a password into a computing device. Oftentimes the security credentials are sent along with the communication. Any party receiving the security credentials can potentially impersonate the user by including the credentials in a subsequent request, which can have any of a number of undesirable results for the user or the party to whom the user was impersonated. Additionally such credentials can also be used to encrypt data to ensure the data is readable only by authorized recipients.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to managing security in an electronic environment. In particular, various embodiments provide for automated renegotiation of seeds, keys, or other secret information in order to cause current versions of the secret information to diverge from older copies of the secret information, thus reducing the ability of an unintended third party having access to an older copy from being able to access protected information and/or resources. The renegotiation can occur in response to a number of potential triggers, or the parties can be configured to enable the secret information to decay, or slowly change, over time such that older copies of the secret information become increasingly less useful. The automatic renegotiation in at least some embodiments can help to ensure the uniqueness of a device submitting a secure code, such as a one-time password (OTP). The renegotiation can include generating a new secret or modifying a previous secret using human-entered material, randomly generated material, and other such information. Authentication applications and other such modules or components of various computing devices can proactively perform a renegotiation, forcing divergence even when there may be no corrupt copy or where the corrupt copy causes the divergence.

Various other functions and advantages are described and suggested below as may be provided in accordance with the various embodiments.

Figure 1:
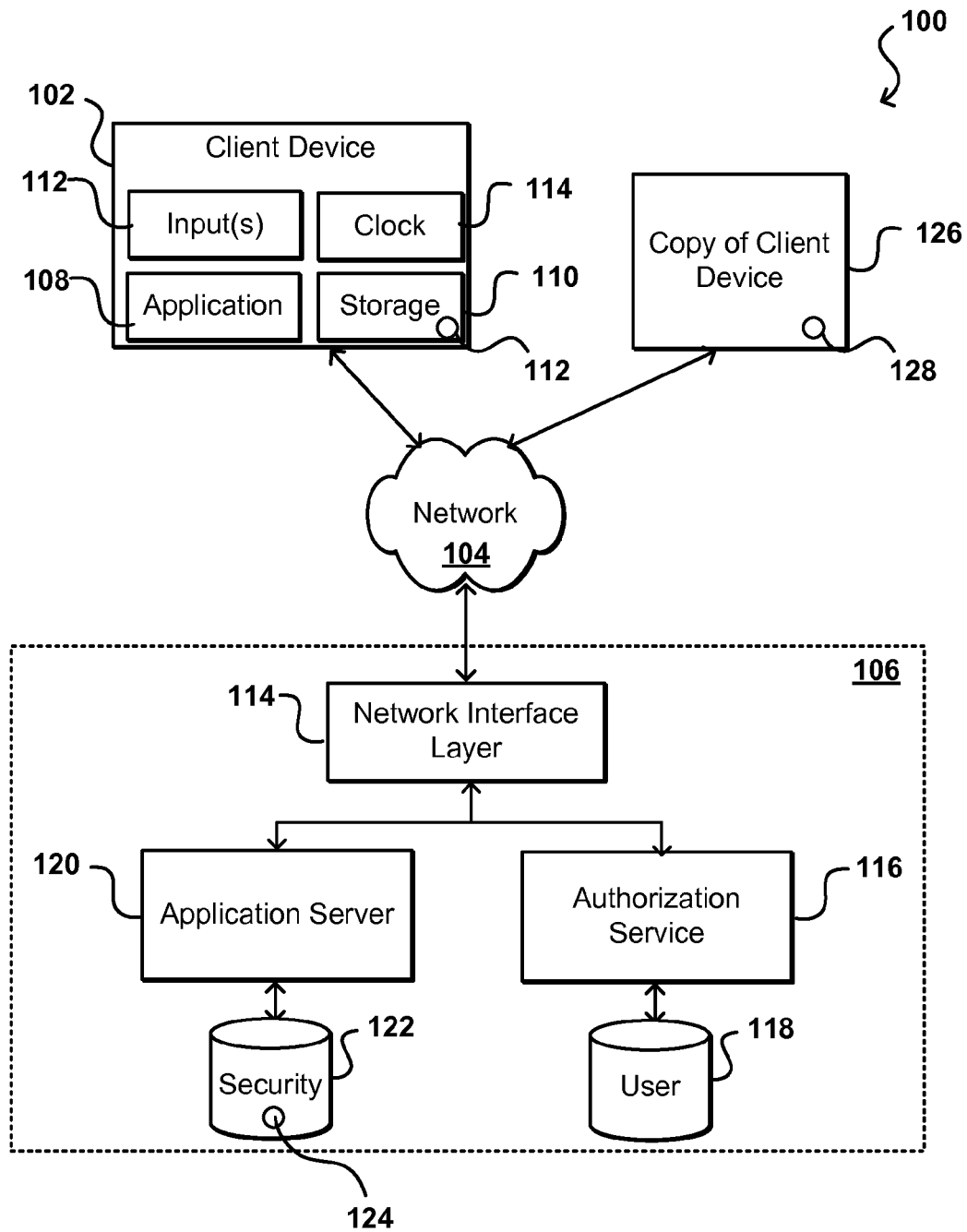
FIG. 1 illustrates an example environment in which aspects of the various embodiments can be that can be utilized.

FIG. 1 illustrates an example environment 100 in which aspects of the various embodiments can be implemented. In this example, a client device 102 is operable to execute an application 108 that is able to send and receive requests across at least one network 104. The client device can be any appropriate computing device capable of receiving, determining, and/or processing input, as may include a tablet computer, a smart phone, an electronic book reader, a desktop computer, a notebook computer, a personal data assistant, a smart phone, a video gaming console, a television set top box, or a portable media player, among others. In at least one embodiment, the application 108 is a Web browser operable to submit requests (e.g., HTTP requests) to a destination across the Internet, as may involve multiple networks such as wireless data networks, cellular networks, and the like. In the example illustrated in FIG. 1, the request can be directed to another entity, such as a resource provider 106, that is operable to receive and process the request, and return an appropriate response. In at least some embodiments, the resource provider be a provider of shared resources in a multi-tenant environment, such as a "cloud" provider. The request might be directed to a Web service provided by the provider 106, for example, where the request might be received to one of a set of application programming interfaces (APIs) or other such interfaces of a network interface layer 114, which can cause information for the request to be directed to an appropriate application server 120 or other such component that includes logic and/or instructions for processing information in the request.

For many types of requests, calls, or other such transmissions over a network 104, it can be desired to authenticate a source of the request and/or protect the information in the request from being available to an unintended third party. In some embodiments, a secure connection (e.g., TSL or SSL) might be used to attempt to prevent unauthorized access to the information transmitted over that connection. Using a conventional approach, the client device 102 and an application server 120 of the provider can attempt to establish a stateful connection, such as by the client requesting a secure connection and potentially providing security credentials to the server. In some embodiments, the client device 102 might first work with an authorization service 116 or other such component or entity to verify an identity, permissions, or other aspects of the client device 102, or a user of the client device, using information stored in a user data store 118 or other such location. After an appropriate authentication procedure, for example, the authorization service can cause one or more security credentials to be issued to the client device 102 and at least one appropriate application server 120 or other such resource. In at least some embodiments, the information can include seed information that can be used by the client device and the server to generate codes, such as one time passwords, that can be used to verify an identity of a source of a request. For example, the client device 102 can use a copy of a seed 112 stored in storage 110 on the client device to generate a code that is sent with a request to the application server 120, which is able to use its copy of the seed 124, stored in a security data store 122 or other such location, to determine whether the code submitted with the request corresponds to seed stored by the client device 102. Various other types of secret information can be used as well within the scope of the various embodiments.

As mentioned, one type of code that can be generated for such purposes is a one-time password (OTP). One time passwords have traditionally been used with hardware tokens (e.g., RSA tokens) that share a secret key with the authenticating entity. As small computing devices such as smart phones have become more prevalent, they are often used in place of hardware tokens. It is often easier to extract a seed from a small computing device than a hardware token. Such an approach enables multiple smart phones to be provisioned using one of the many available authenticator applications (e.g., multi-factor authentication (MFA) applications) available for a smart phone, which can be used to sign into a Web service, application server, etc. Seed information used to generate one-time passwords or other such credentials can be provided to the applications, enabling the smart phones to be authenticated to the appropriate entity. While such flexibility is desirable in many situations, the approach can potentially be undesirable as the loss of the initial secret can be relatively hard to detect, and it can be potentially more difficult to prevent sharing of an authentication token. In some cases, the sharing of seed information among multiple devices might actually go against the concept of an MFA application, as the seed information being able to be replicated means that a recipient of a request may not be able to determine with any certainty whether a certain device has a particular token or other security credential. Storing the seed to an application of a smart phone enables the seed information to be potentially stolen from the phone through an exploit against the phone, an action by a carrier, a copy being made of a backup of the phone, etc.

As an example, an unknown person might obtain access to a backup or machine image of the client device 102 in FIG. 1, and cause a copy 126 of that client device to be generated that can also include a copy 128 of the seed information. If the copy 126 of the client device generates an appropriate code using the seed and submits a request that is received by the application server 120, the application server may determine that the request includes an appropriate code and treat the request as if the request came from the client device 102, as the application server may have no way of otherwise distinguishing between the client device 102 and the copy 126.

Approaches in accordance with the various embodiments can attempt to minimize the effects of stolen or otherwise obtained seed information by an unauthorized or unintended entity. In at least some embodiments, the seed information is renegotiated, updated, rotated, or otherwise changed automatically at various times in order to invalidate all other copies of the seed or other secret material that might exist elsewhere. Such an approach can be used to ensure the uniqueness of devices, such as OTP devices. Further, depending at least in part upon the capabilities of a device, the new seed material can include information unique to the device, information randomly generated by the device, or human-provided material, among other such options. For devices such as smartphones that typically have network connections, a device can reach out to the server or another such component as needed for key renegotiation or other such actions.

Referring back to FIG. 1, a client device 102 can include a clock 114 that can provide the device with information for the current time. For time-based OTP codes, each code can be generated based at least in part upon the seed information and the current time, using a formula or algorithm agreed upon by the client device 102 and the application server 120. Since devices such as smart phones are relatively inexpensive devices, the clocks will likely eventually be out of sync with the actual time, either getting ahead or behind the actual time by a certain amount. In many cases the smart phones or other such devices will not automatically determine and correct the time of the clock, and there may be no explicit way to set that clock for at least some devices. The clock 114 on the device getting out of sync with a clock (not shown) used by the application server can cause the code generated by the device, which is based upon the time of the device clock, to not match the code the server is expecting to receive, based on the time determined by the server, and thus may be determined to be invalid.

Further, processes discussed herein can cause the "synchronized" time to intentionally vary by amounts in addition to any drift over time, such that devices obtaining seed and/or code information will be less likely to have subsequent requests based on the seed and/or code accepted as the time corresponding to the seed or code will be more likely to fall outside the allowable time window. In some embodiments, a client device and/or a receiving device can intentionally vary the time used for synchronization by a determined amount, variable amount, random amount, amount determined by a formula, etc. Each time a code is accepted as valid for authentication, the new time value can be selected or designated for use in subsequent authentications. In some embodiments, a client device can be supplied with an intentionally irregular clock, or clock that does not keep proper time, such that the time differences will increase over time without having to generate a new time value for each valid authentication. Various other processes can be used as well within the scope of the various embodiments.

Figure 2:
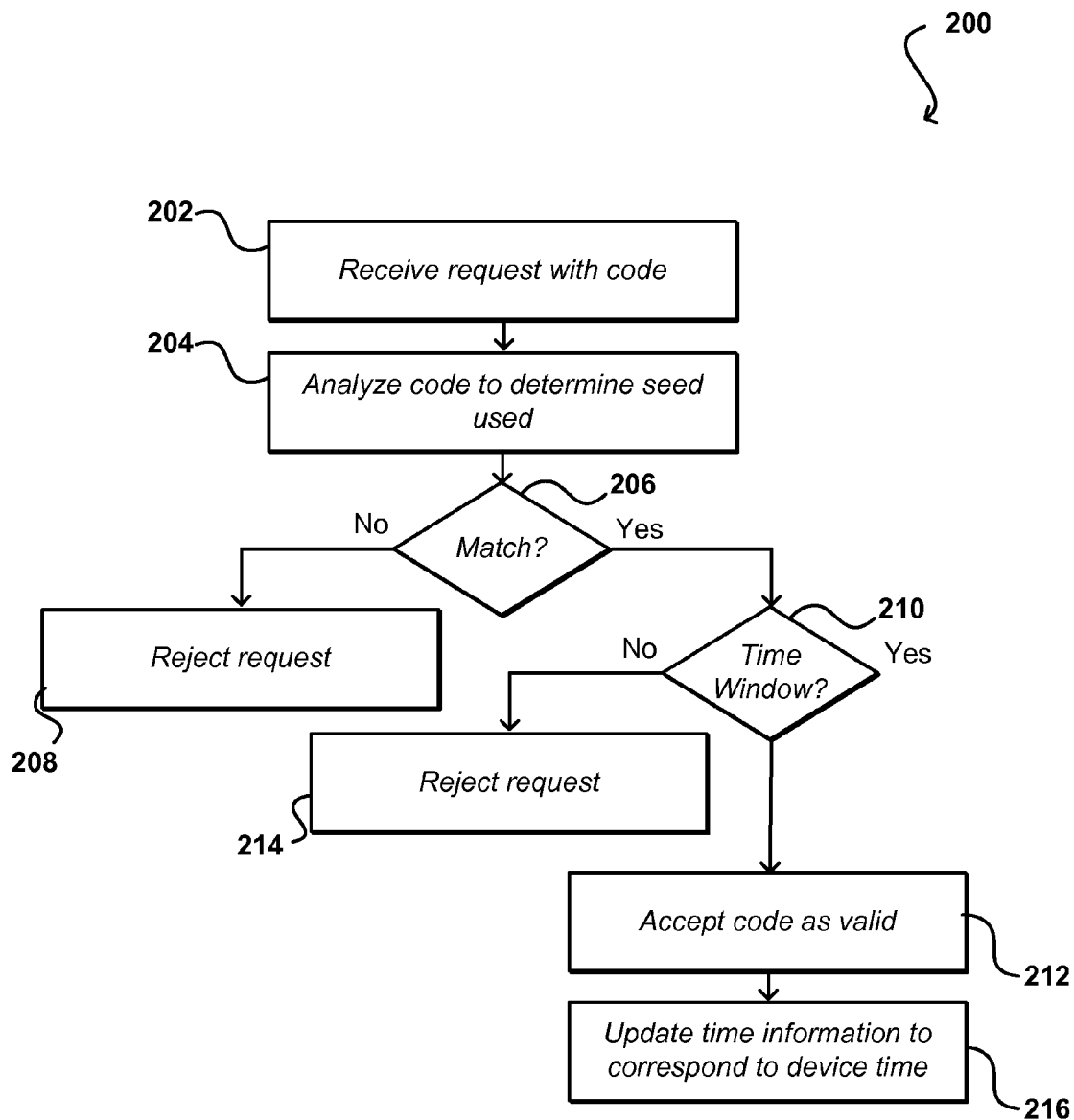
FIG. 2 illustrates a first example process for automatically renegotiating seed information that can be utilized in accordance with various embodiments.

FIG. 2 illustrates an example process 200 for renegotiating seed and/or code information that can be utilized in accordance with various embodiments. It should be understood that there can be fewer, additional, or alternative steps performed in similar, or alternative, orders within the scope of the various embodiments unless otherwise stated. Further, although this and other examples discussed herein relate to a client device and an application server, it should be understood that the examples can apply to other appropriate senders and recipients as well within the scope of the various embodiments. In this example, a code (e.g., an OTP) is received 202 from a client device. The code can be analyzed 204 to determine the seed that was used to generate the key as well as the time at which the code was generated, from the perspective of the clock of the client device. If the seed is determined not to match 206 the seed stored by the application server, the authentication of the request can be denied 208. If the seed does match the seed stored by the application server, a determination can also be made as to whether the time information contained in the key is valid 210, such as the time being after a time of a last received code from that client device and within a determined window of time of the current time, from the perspective of the application server. In at least some embodiments, an application server or other such entity can enable the clock of the client device to be out of sync up to a determined amount of time. For example, the clock might be allowed to be up to five minutes ahead, or behind, the clock of the server. If the server receives a code with a time that is incorrect, but the time information is within an allowable window of time from the current time, the server can go ahead and accept 212 the code as valid for authentication. If the time falls outside those parameters, the authentication can be denied 214. The server in at least some embodiments will then also update 216 information about the client device clock and store this information in local storage, such that the server knows the authenticated client device is a certain amount ahead, or behind, the server for future code authentications. As discussed, an intentional variation can be applied for each, any, or at least a selection of the authentications, in order to increase the likelihood that an unintended party obtaining a seed or code will be unable to generate a code that will be successfully authenticated for a subsequent request or action. The client device in some embodiments can submit the new time variation with each request, in response to a successfully authenticated request, or at other appropriate times, or a recipient or component authenticating a code can send an amount of time variation (or other such value) to the client to be used for subsequent code generation.

Using such an approach, a subsequent key or code from that client device can be accepted even if, based on the amount of clock drift and any intentional variation, the current value of the device clock exceeds an allowable difference from the server clock. Unless a copy of the client device, or other device having access to the seed, is aware of the amount of variation, the copy might submit a key generated using the seed and its determination of the current time, which might fall outside the allowable time window from the time value stored for the client device. The time differences of the client device thus can be handled through automatic renegotiation, and the correct code based on the time data will diverge from a code generated using a copy of the seed but a current, or different, time value from a separate clock. Similarly, if a time adjustment is made for an unauthorized device that causes a request from the authorized device to fail, the user of the authorized device will know that something is wrong and will have an adjustment made to synchronize the seeds and invalidate the copy of the old seed stored by any unauthorized device.

In at least some embodiments, the server can ask for a second code before adjusting time information for the client device. If the request was from a legitimate source with a clock that is out of sync with the server, the new code generated will be based on time information that is out of sync by approximately the same amount. If the code was stolen the subsequent request likely will be unable to include a new code generated using the function and the updated, but out of sync, time information. Such an approach enables an automatic, clock-based resynchronization of a client device with a server or other such component.

Resynchronizations can also be performed at other appropriate times than when a client clock time drifts by, or beyond, a certain amount. For example, each seed might be valid for a determined period of time, after which a resynchronization can be performed. Similarly, a seed might be valid for only a determined number of attempts, such as for 100 requests, after which a resynchronization can be performed. Various other triggers can be used as well within the scope of the various embodiments.

Referring back to FIG. 1, the client device 102 can have one or more input mechanisms 112 that can be used to generate events for code generation. For example, a smartphone might have a button that is designated as a counter button, which when pressed or otherwise selected by a user causes a counter of the device to increment. A current value of the counter can be used with the seed information to generate a code to be entered by the user in order to access the application server 120 from the client device 102. The server can include a counter as well, which will increment each time a request is received and successfully validated such that the server and client will have a common count and thus can expect the same code to be generated for the next request. In at least some embodiments the counter can be monotonically increasing, and unable to move backwards. It is possible that when such an input is provided on a device such as a smart phone that a user might inadvertently cause the counter to update by accidentally pressing the button when the device is in the user's pocket, or another such situation. Since the server will not get a request with the updated count, the server and device will be out of sync. Such a process can cause an authentication request from the client device to be denied.

Figure 3:
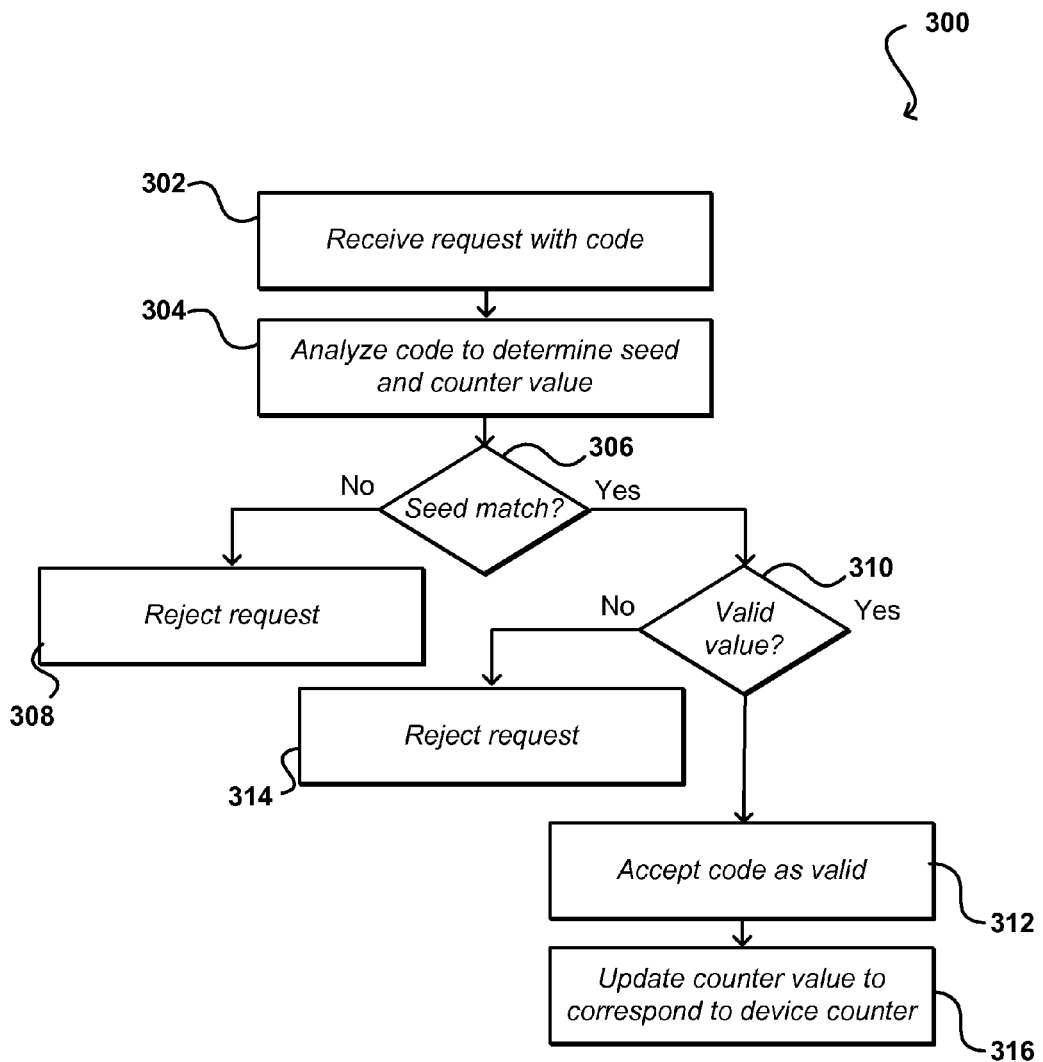
FIG. 3 illustrates a second example process for automatically renegotiating seed information that can be utilized in accordance with various embodiments.

FIG. 3 illustrates another example process 300 for renegotiating secret information that can be utilized in accordance with various embodiments. In this example, a code is received 302 from a client device, where that code was generated using seed information and information from a counter on the device. The code is analyzed 304 to determine the seed that was used to generate the code, as well a value of the counter of the client device at the time the code was generated. If the seed is determined not to match 306 the seed stored by the application server, the authentication of the client device can be denied 308. If the seed does match the seed stored by the application server, a determination can be made as to whether the count from the client device matches 310 a current corresponding count of the server. As discussed, the server can keep a local copy of the counter, which is incremented each time a valid authentication occurs for that client device (or at other appropriate times). If the server receives a count that is incorrect, but the count is ahead of the current count by at most an allowable amount of deviation, the server can go ahead and accept 312 the code as valid for authentication. If the count falls outside those parameters, the authentication can be denied 314. The server in at least some embodiments will then also update 316 the current count stored locally to match the current count of the client device as determined by the code. In this way the server can automatically resync with the client device such that future authentication requests succeed. Unauthorized client devices might not be aware of the updated count, and might submit codes based on lower count values. As discussed, such code can be rejected. This synchronization can, as with the time-based approach discussed above, be acceptable even if the request is from an unauthorized source, as the next request submitted from an authorized device will include a code based on a counter value that is lower than is expected by the server, and thus will be rejected such that the user can know something is wrong and cause the seed to be renegotiated.

In some embodiments there can be multiple inputs that each can enable a different type of information (e.g., a different count, state value, etc.) to be added to the seed. For example, there might be multiple options displayed on the screen, each of which corresponds to a different piece of information to be added to the seed. Such an approach can still enable seeds to be updated in response to events, but also enable the server to determine that a code generated using that seed is valid. In some embodiments, a count can be provided with the code or request as well, or the additional information can be based in some way on the current count, in order to provide for improved security and uniqueness. In some embodiments, the device can add an amount of random information to a seed in response to an event, as long as the information is of a type or amount that can be determined by the server to be valid. In other embodiments, the device can request a new seed in response to the event, whereby a server will add a small amount of random information to the seed and send a code from which the new information can be extracted. Adding two bits of entropy, for example, can quickly cause the current and old versions of the key to diverge.

In some embodiments an event updating a counter can cause information for a time of the updating to also be stored. The code that is then provided to the server can be based at least in part upon the seed, the counter value, and the history of timestamps of the events. The server upon receiving the code can verify the counter value and the seed, and can ensure that the timestamp is after a time of the previous timestamp, and is within a range of an expected value based at least in part upon an amount of time that has passed since the last timestamp was received.

In some embodiments each code might be ten digits, where the base six digits are based on a seed and the remaining four digits are generated using an entropy algorithm of the client device (or server, etc.). When a server receives such a code from a client device, for example, the server can determine that the device injected some entropy and can handle that code accordingly.

Another process can utilize a "challenge-response" based approach. In this example the server presents a question (the "challenge") and the client device has to provide a valid "response" in order to be authenticated. An example of a challenge response approach is asking for a password (e.g., an OTP) as part of the challenge, and then receiving the password as a correct response. The response in one embodiment can be a hash-based message authentication code (HMAC) generated using a seed stored by the client device. A third party having gained access to the seed can potentially also provide an appropriate response. It thus can be desirable to add or update information used to generate the code or password while the system is in operation such that any copies of the password will no longer work after a renegotiation.

Figure 4:
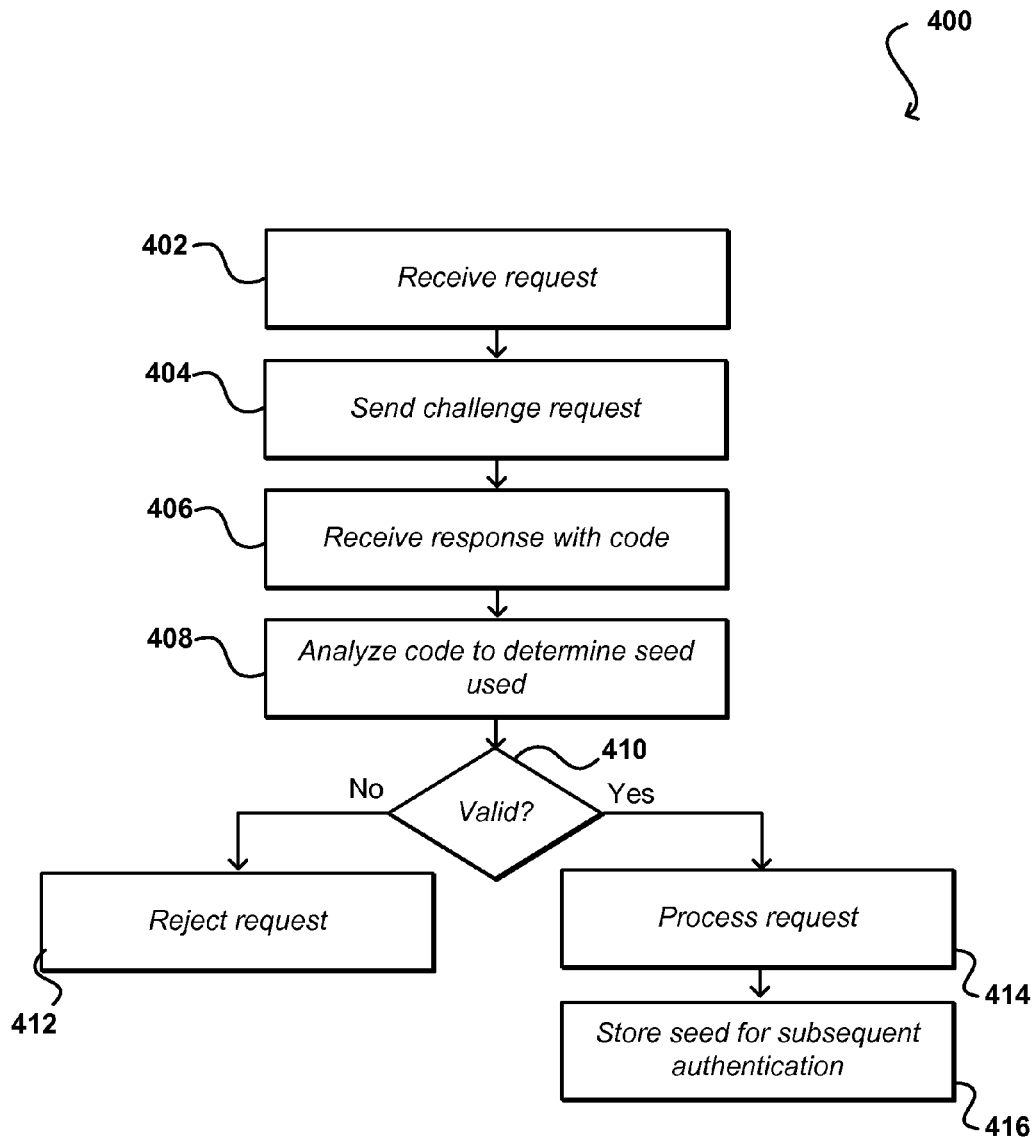
FIG. 4 illustrates a third example process for automatically renegotiating seed information that can be utilized in accordance with various embodiments.

FIG. 4 illustrates another example process 400 for renegotiating secret information that can be utilized in accordance with various embodiments. The addition of information can be performed by the server and/or the client device, but in this example the addition is performed by the client. In this example, a request to perform an action can be received 402 from a client device. In response to the request, an application server can send 404 a "challenge" request to the client, where the challenge is to respond with a valid code (e.g., OTP or other). The challenge in at least some embodiments can function as a trigger to perform a renegotiation using a key negotiation algorithm, for example, such that older copies will no longer work. The algorithm can enable the device to add any appropriate amount of random material, in order to generate a new key that is able to be validated by the application server. In this example, a code is received 406 from the client device as a "response." The code is analyzed 408 to determine the seed that was used to generate the code. A determination is made as to whether the seed is valid 410. If the challenge was to generate a new seed and the seed that is returned either matches the currently stored seed, or falls outside the allowable changes to the current seed, the authentication can be denied 412. If the seed falls within an allowable amount and type of change, the server can process 414 the original request and store 416 the new seed for use in subsequent authentication of the client device. As with other approaches discussed herein, the server can then automatically resync with the client device such that future authentication requests succeed. Unauthorized client devices might not be aware of the updated seed, and might submit codes based on past seeds. As discussed, such code can be rejected. This synchronization can, as with the time-based approach discussed above, be acceptable even if the request is from an unauthorized source, as the next request submitted from an authorized device will include a code based on an incorrect seed, and thus will be rejected such that the user can know something is wrong and cause the seed to be renegotiated.

In some embodiments, a seed or secret can also (or alternatively) be combined with something that is bound to the client device in order to generate a unique key or code for that specific device. For a smart phone, for example, a seed can be used with information on a SIM card in order to negotiate a new key. Various other types of information unique to the device can be utilized as well within the scope of the various embodiments.

In some embodiments, the server can be configured to add information to its challenge and/or the client device can be configured to add information to its response. The information can be added for each challenge and response, after a number of responses, at regular intervals, or at any other appropriate time. For example, a device can be configured to update a seed every minute, every hour, or every day, among other such options. In at least some embodiments, the device can be configured to add or change a bit for a seed at regular intervals, and can generate codes based on the seed with the new bit. The server, upon receiving the code, can determine that a seed was used that varied by one bit. As long as the change complies with any agreed criteria or limitations, such as a frequency or amount of change, etc., the server can accept the code and also update the seed in the local store. If the seeds are changed at regular intervals, the server can know when to expect a changed bit, and can accept codes for changed bits at those times and/or reject codes with changed bits before those times (given some time drift variance as discussed above). Once the new seed is accepted, codes generated using the old seed will no longer be accepted. Such an approach enables proactive rekeying even when there is no channel available for an active renegotiation between the server and the client device. A potential downside to a time-based key renegotiation is that the approach can require the client device to communicate with the server on a regular basis within the determined time periods in order to keep the new keys synchronized.

Various other automated rekeying approaches can be used as well within the scope of the various embodiments. For example, if a network channel is available between the client and the server, a secure connection (e.g., SSL) plus a rekey request based on the old seed can be sufficient to enable a new key to be specified, which in this example does not need to be related in any way to the old key. The new key can then either be generated and transmitted by the client or the server, and then agreed upon by both devices.

Figure 5:
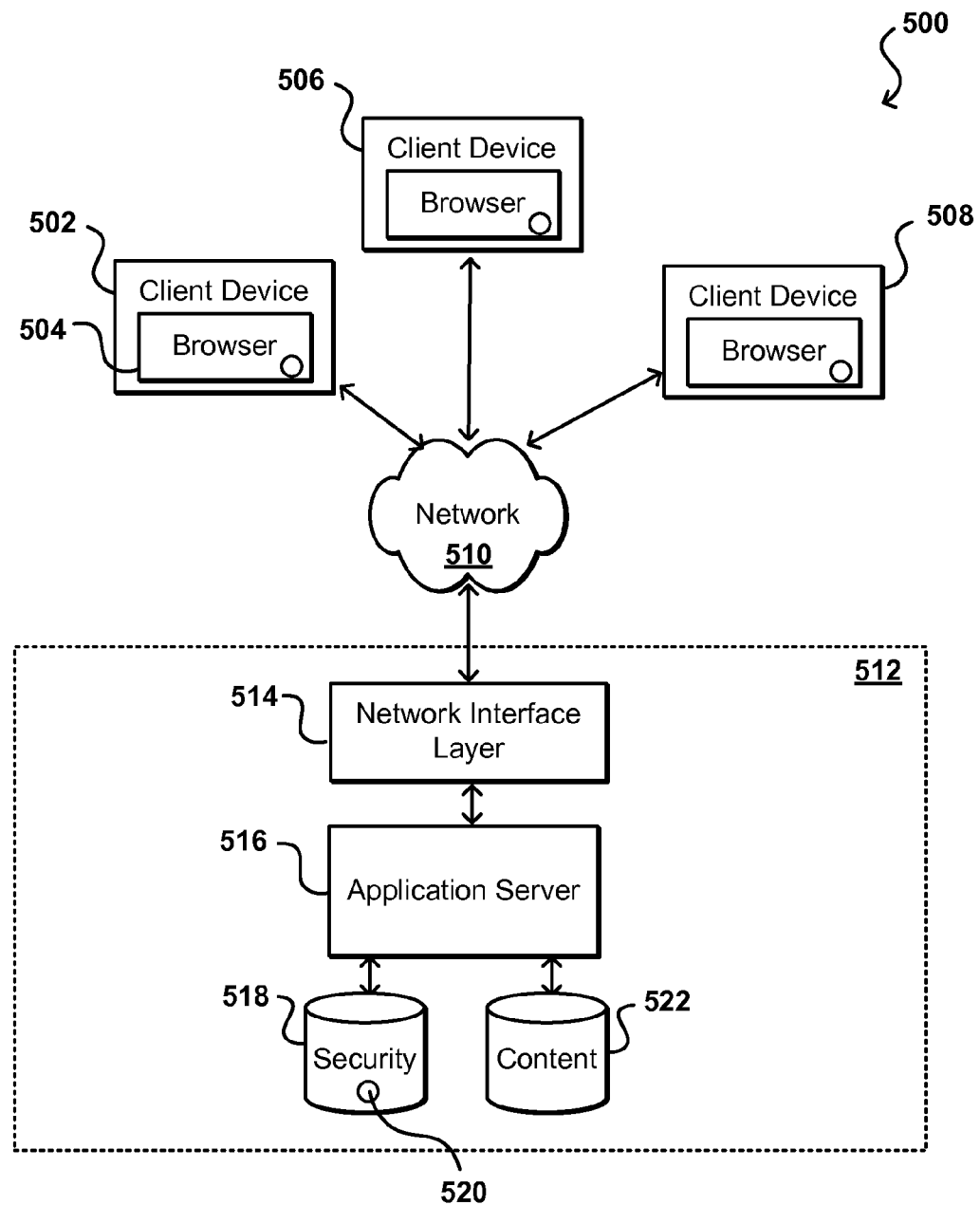
FIG. 5 illustrates another example environment in which aspects of the various embodiments can be that can be utilized.

In some embodiments there can be multiple devices (e.g., client devices and/or servers) sharing seed or key information as discussed above, whether used for an OTP-based approach or otherwise. For example, FIG. 5 illustrates an example environment 500 wherein multiple client devices 502, 506, 508 can contact a content provider environment 512 to obtain content from one or more application servers 516 and/or data stores 522. The provider in this case might provide a streaming video and/or audio service, and might provide keys that the client devices are to use to request content from the provider. In this example, an application server 516 might generate a single seed 520, for at least a type of content, groups or users, etc., and store this information in a security data store 518 or other such location. The application server 516 can cause a copy of this seed to be provided to, and stored by, each of the client devices 502, 206, 508. When a client device wants access to content from the provider, the client device utilizes that seed, key, or other secret material to generate a code to be used in authenticating the client device and obtaining the content. Using such an approach, however, any unauthorized client device obtaining a copy of the seed or key can generate an appropriate code and obtain content from the provider.

Accordingly, approaches in accordance with various embodiments can utilize seeds or keys that slowly change over time. Such keys can be thought of as "decaying," as the amount that a current key differs from a specific previous key will increase over time, such that the usefulness or the previous key to an unauthorized client device decreases over time. For example, an application server 516 can be configured to periodically add key material, or produce new key material, at regular intervals, in response to events, or at other appropriate times. Each new key will be based on the previous key, but with at most a determined amount of entropy added or introduced. Thus, when a recipient such as a client device receives the new key, the recipient can analyze the key with respect to the various allowable changes that could have been made to the old key. If the new key matches the old key within an allowable amount and type of variation, the key can be updated to the recipient as the new key. Such an approach enables keys to be slowly updated and synchronized over time. As long as the application server sends the new key information to the authorized client devices, the unauthorized clients may be able to determine the new key to use. In some cases the server might accept requests that still utilize the old key for a period of time, such as where a client device might not have received the new version of the key. As time goes along, however, the key will continue to change to the point where an old key will no longer work.

In at least some embodiments, a key might change slowly enough that a client device can determine a legitimate key even if the client missed one or two of the previous updates. A client device being able to validate the key and then submit the new key material with subsequent requests becomes proof that the client device received at least a reasonable subset of the previous transmissions with key information. Because the changes are gradual and not based on a step function-type approach, a client device can catch up by a reasonable amount even if one or more updates are missed.

Figure 6:
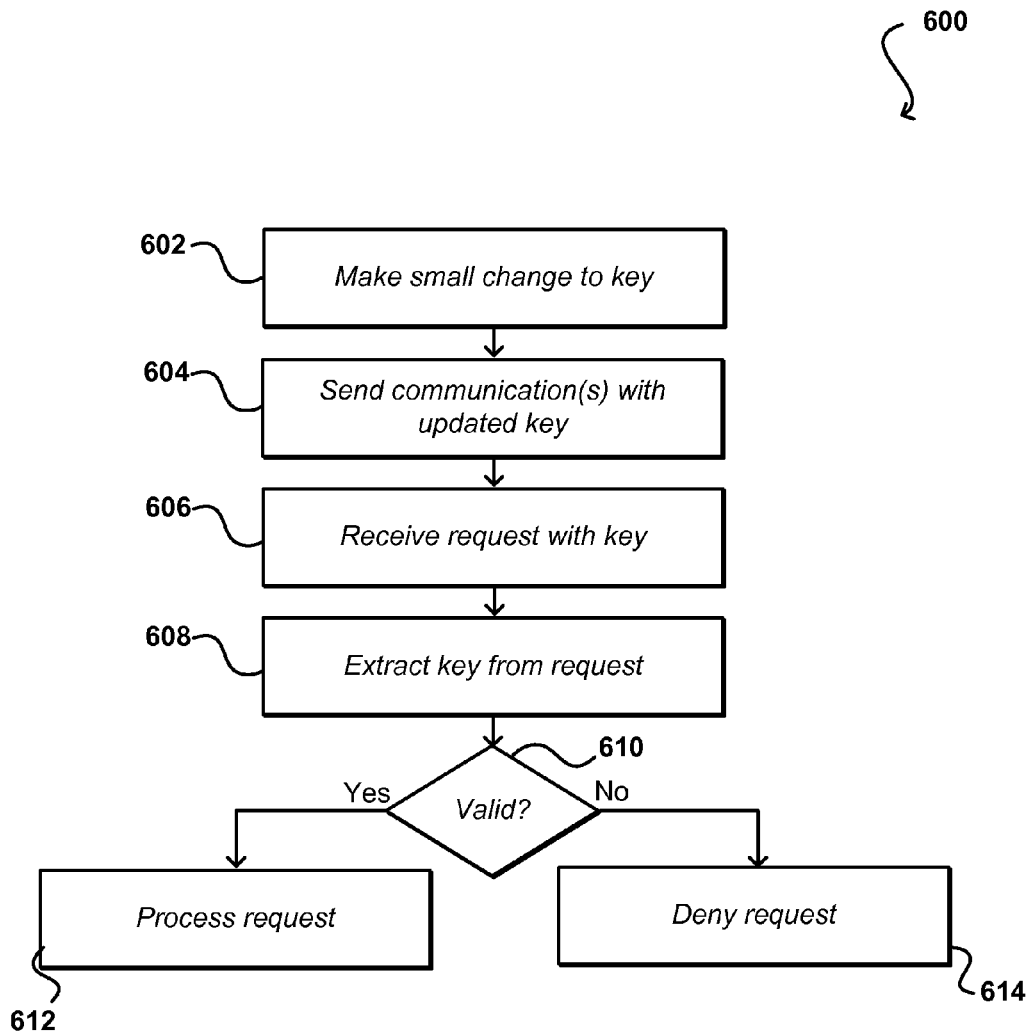
FIG. 6 illustrates a fourth example process for automatically renegotiating seed information that can be utilized in accordance with various embodiments.

FIG. 6 illustrates an example process 600 for slowly adjusting a key, and automatically resynchronizing that key, that can be utilized in accordance with various embodiments. Adjustments to the key can be made at the client device, the server, or any other appropriate sender, recipient, or other such entity. In this example, a server makes 602 a small change to a key, such as by adding or changing a bit, adding an amount of random information, and the like. The changes can be made at any appropriate time, such as at regular intervals, after a number of successful authentications, or in response to other such times or events. The server can send 604 a communication with the updated key to a client device. The client device, upon receiving the updated key, can determine that the key is valid based on the key having an allowable amount and type of deviation from the previous key. In this example, the client might not have received all previous changes to the key, but due to the slow changing nature of the key the client device can determine that the key is valid based on previously received information, up to a number of missed information. An authorization request can be received 606 from the client device that includes the key. The key is extracted 608 from the request, and a determination is made 610 as to whether the seed is valid. If the key is a matching key, or is within an allowable amount of deviation from the current key, as may correspond to one of the previous keys where the client device did not receive, or yet receive, the latest change, the authentication can be accepted 612. If the key does not match within an allowable amount of deviation, the authentication can be denied 614. As with other approaches discussed herein, the client device can automatically resync with the server such that future authentication requests succeed. Unauthorized client devices might not be aware of the updated key, and might submit old keys that will cause the associated requests to be denied.

In this way, a content provider such as a satellite provider can continually rekey the receiving devices to be able to decrypt the content that is broadcast by the provider, even when the client devices might only be used periodically and might not receive every adjustment to the key. A copy of a client device that does not receive many of the updates, however, will likely eventually be unable to decrypt the broadcast content unless obtaining a new version of the key, which will again only work for a limited amount of time. Approaches that utilize slowly changing keys, instead of completely mutating keys or seeds, can be utilized in situations without multiple transmitters or receivers as well.

Figure 7:
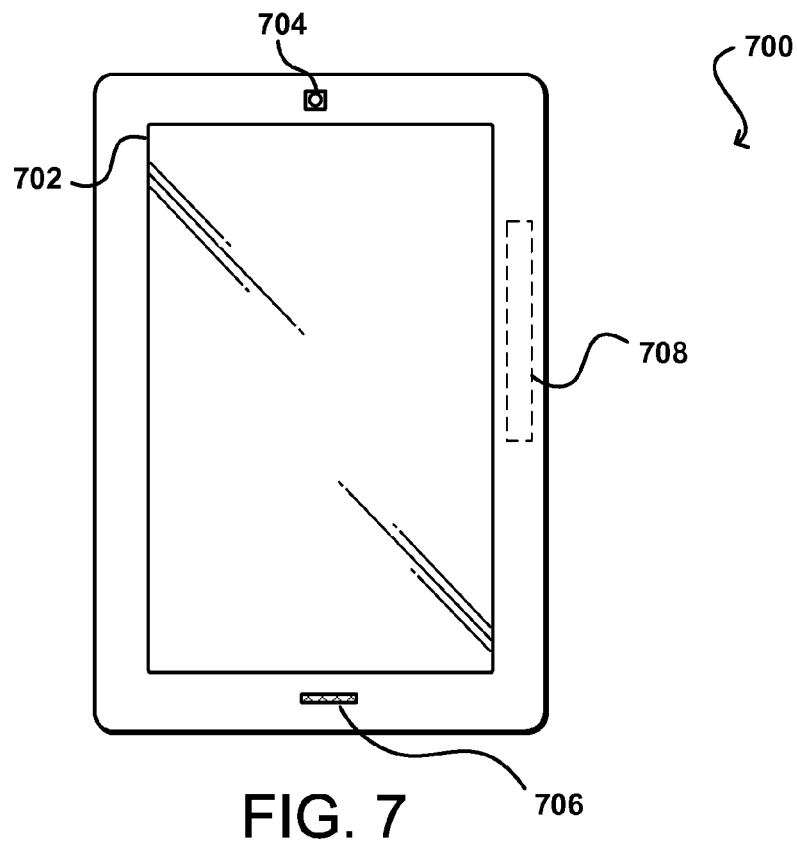
FIG. 7 illustrates an example client device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 700 has a display screen 702 operable to display information to a user facing the display screen (e.g., on the same side of the computing device as the display screen). The computing device can include various elements enabling a user to provide input to the device, such as a touch-sensitive display screen 702, at least one camera 704, a microphone 706, a keyboard or touchpad, or other such elements. The example computing device 700 also includes at least one communication mechanism 708 enabling the device to send and receive communications over at least one network. These networks can include, for example, a local area network (LAN), the Internet, an intranet, a cellular network, a wireless data communications network, and the like. In some embodiments, the computing device can also include at least one secure input LED or other such element operable to indicate when input is currently being fed into the BSM, as opposed to "normal" input.

Figure 8:
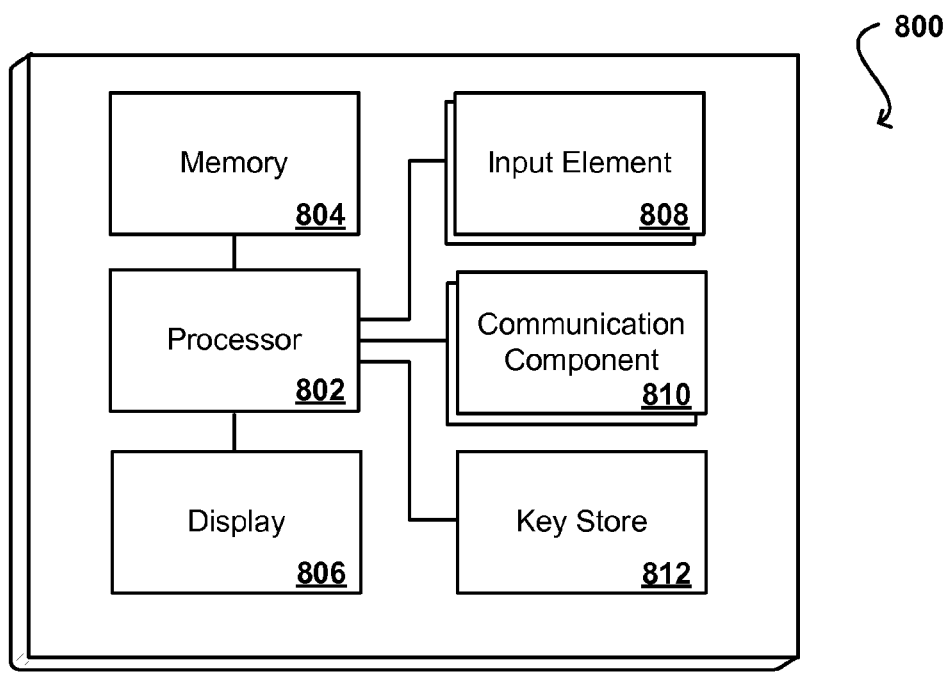
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more communication elements 810, such as a Wi-Fi, Bluetooth, RF, wired, or wireless communication system. The device in many embodiments can communicate with a network, such as the Internet, and may be able to communicate with other such devices. The device 800 also can include at least one key store 812, which can be implemented through hardware and/or software. The key store can be a portion of memory, a portion of a local data store, etc. Access to the key store can be restricted to one or more applications, components, users, etc.

Figure 9:
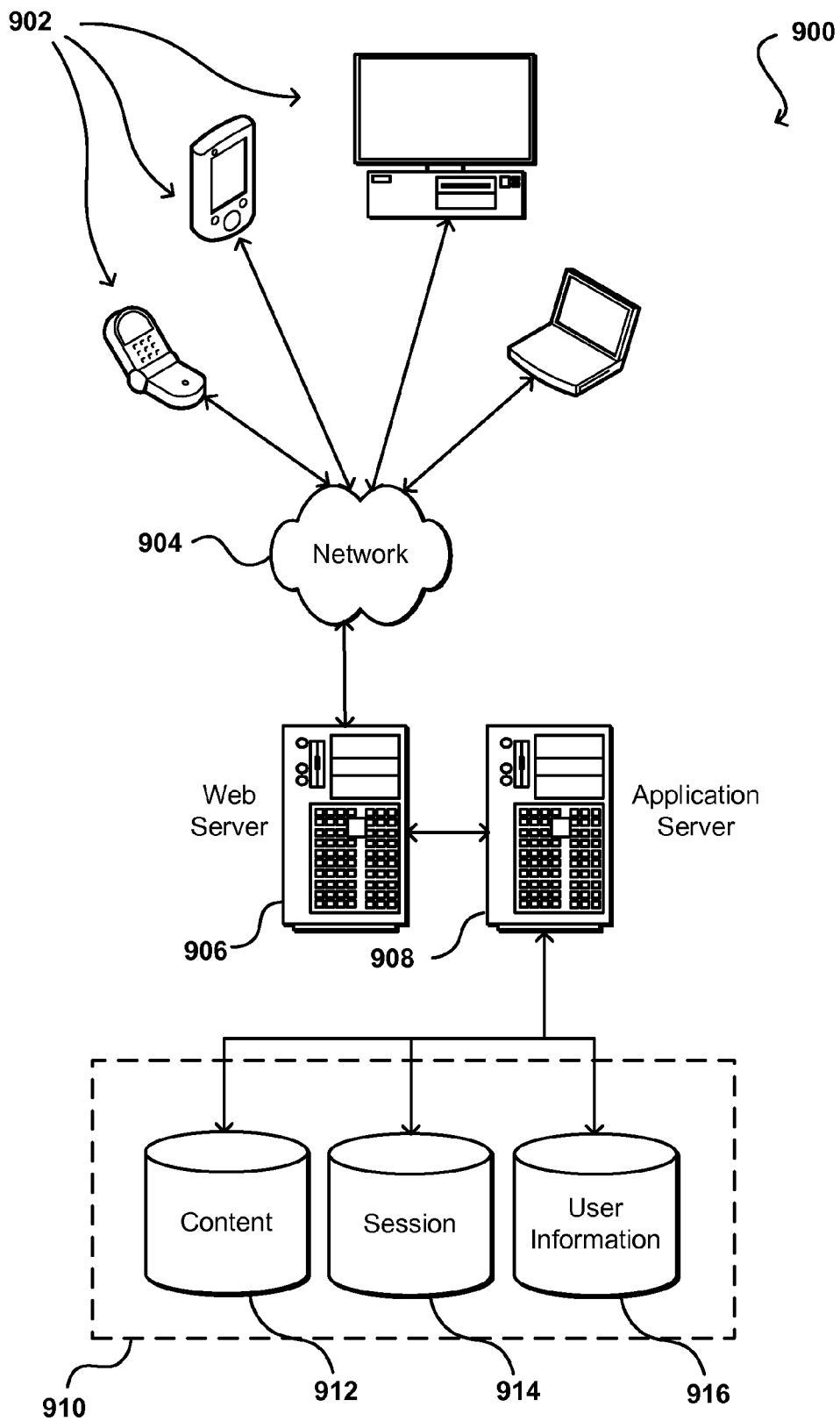
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    at least one processor; and
    a memory device including instructions that, when executed by the at least one processor, cause the computing device to:
        receive a request from a client device, the request including provided information generated using a seed and a counter value of a counter on the client device;
        analyze the provided information to determine the seed and the counter value used to generate the provided information;
        compare the seed to an expected seed value, the expected seed value including information combined with a previous seed value by the client device upon detection of an event;
        compare the counter value to an acceptable counter value for the request;
        compute at least one reference information, the at least one reference information computed based at least in part upon the expected seed value and the acceptable counter value; and
        in response to the provided information matching the at least one reference information, accept the request.

2. The computing device of claim 1, wherein the expected seed value is valid for a predetermined number of attempts or a predetermined period of time.

3. The computing device of claim 1, wherein the instructions, when executed by the at least one processor, further cause the computing device to:
    in response to the counter value being ahead of the expected counter value, accept the request.

4. The computing device of claim 3, wherein the instructions, when executed by the at least one processor, further cause the computing device to:
    in response to accepting the request, send a counter value difference between the counter value and the acceptable counter value to the client device.

5. The computing device of claim 1, wherein the provided information is generated based at least in part upon a clock of the client device.

6. A computer-implemented method for proactively renegotiating a shared secret, comprising:
    receiving a request from a client device, the request including provided information generated using a seed and a counter value of a counter on the client device;
    comparing the seed to an expected seed value, the expected seed value including information combined with a previous seed value by the client device upon detection of an event;
    comparing the counter value to an acceptable counter value for the request;
    computing at least one reference information, the at least one reference information computed based at least in part upon an expected seed value and an acceptable counter value; and
    in response to the provided information matching the at least one reference information, accepting the request.

7. The computer-implemented method of claim 6, further comprising:
    denying the request if the seed does not match the expected seed value or the counter value being behind the expected counter value.

8. The computer-implemented method of claim 6, wherein the provided information is generated at least based at least upon an amount of random information added to the seed.

9. The computer-implemented method of claim 6, wherein the provided information is generated based upon a revised seed calculated by combining the seed and a unique code associated with the client device.

10. The computer-implemented method of claim 6, wherein the expected seed value is valid for a predetermined number of attempts or a predetermined period of time.

11. The computer-implemented method of claim 6, further comprising:
    in response to the counter value being ahead of the expected counter value and a determination that the seed used to generate the provided information matches the expected seed value, accepting the request.

12. The computer-implemented method of claim 6, further comprising:
    in response to accepting the request, automatically incrementing the acceptable counter value; and
    sending a counter value difference between the counter value and the acceptable counter value to the client device.

13. The computer-implemented method of claim 6, further comprising:
    in response to denying the request from the client device and a determination that the counter value is behind of the expected counter value:
    prompting at least one authorized device to make an adjustment to at least one of the seed or the counter value; and
    synchronizing the adjusted seed and the expected seed value, and/or the counter value and the acceptable counter value.

14. The computer-implemented method of claim 6, further comprising:
    in response to accepting the request, causing the client device to vary at least one of the seed used to generate the provided information or the counter of the client device.

15. The computer-implemented method of claim 6, wherein the counter of the client device is a monotonically increasing counter.

16. A non-transitory computer-readable storage medium including instructions that, when executed by at least one processor of a computing device, cause the computing device to:
    receive a request from a client device, the request including provided information generated using a seed and a counter value of a counter on the client device;
    compare the seed to an expected seed value, the expected seed value including information combined with a previous seed value by the client device upon detection of an event;
    compare the counter value to an acceptable counter value for the request;
    compute at least one reference information, the at least one reference information computed based at least in part upon an expected seed value and an acceptable counter value; and
    in response to the provided information matching the at least one reference information, accept the request.

17. The non-transitory computer-readable storage medium of claim 16, wherein the instructions, when executed by the at least one processor, further cause the computing device to:

deny the request if the seed does not match the expected seed value or the counter value being behind the expected counter value.

18. The non-transitory computer-readable storage medium of claim 16, wherein the instructions, when executed by the at least one processor, further cause the computing device to:

in response to accepting the request, automatically increment the acceptable counter value; and send a counter value difference between the counter value and the acceptable counter value to the client device.

19. The non-transitory computer-readable storage medium of claim 16, wherein the instructions, when executed by the at least one processor, further cause the computing device to:

in response to accepting the request, cause the client device to vary at least one of the seed used to generate the provided information or the counter of the client device.

20. The non-transitory computer-readable storage medium of claim 16, wherein the instructions, when executed by the at least one processor, further cause the computing device to:

in response to accepting the request, send a counter value difference between the counter value and the acceptable counter value to the client device.

\* \* \* \* \*